Dec. 5, 1950     A. B. HANSON     2,533,008
ARTIFICIAL LEG
Filed Nov. 5, 1947                      2 Sheets-Sheet 1
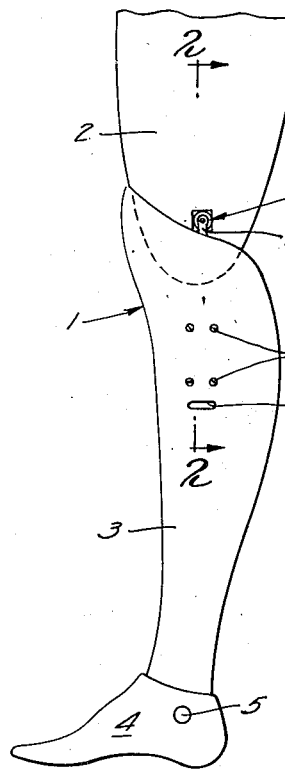
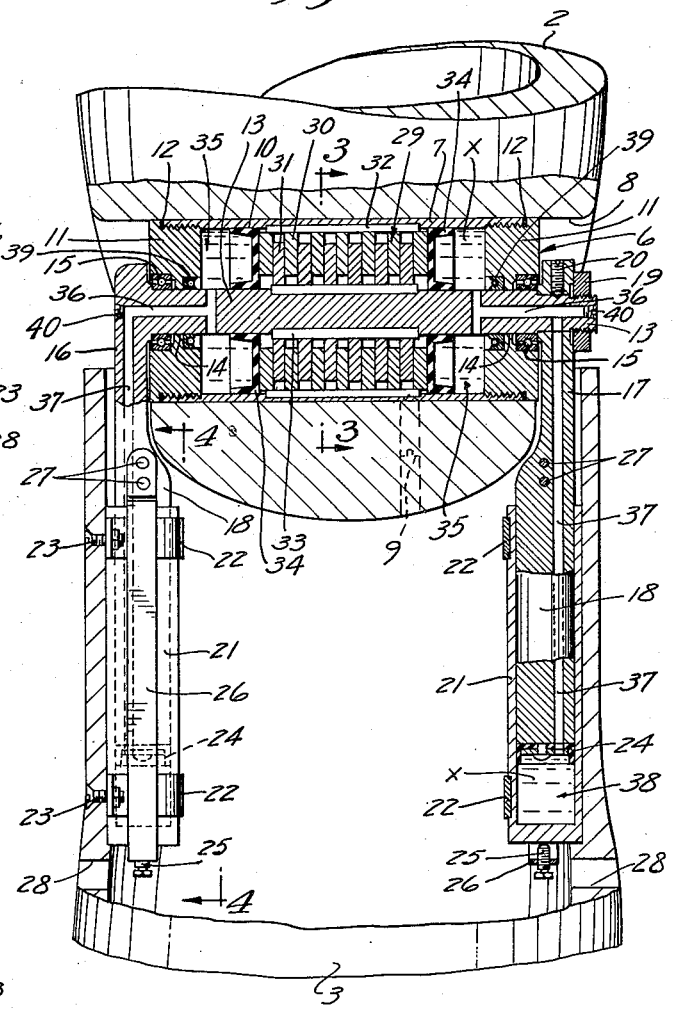
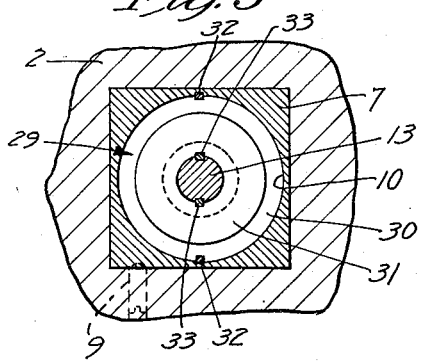
Inventor
Arnold B. Hanson
By his Attorneys
Merchant & Merchant Dec. 5, 1950  A. B. HANSON  2,533,008
ARTIFICIAL LEG
Filed Nov. 5, 1947  2 Sheets-Sheet 2
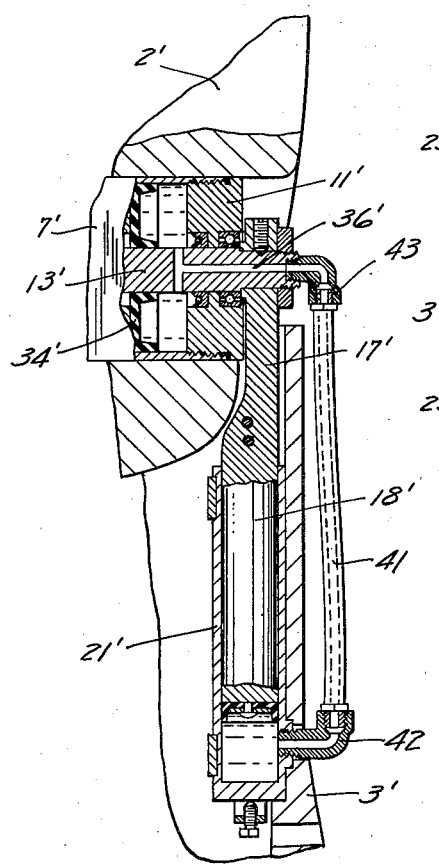
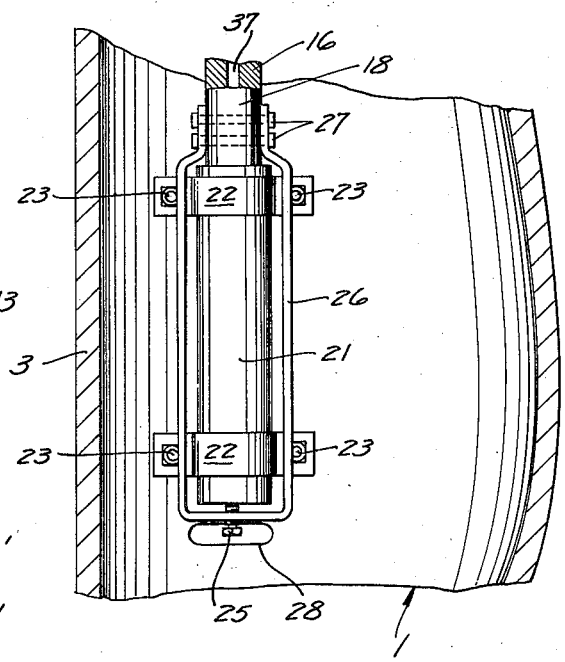
Inventor
Arnold B. Hanson
By his Attorneys
Merchant & Merchant Patented Dec. 5, 1950

2,533,008

UNITED STATES PATENT OFFICE 2,533,008

ARTIFICIAL LEG

Arnold B. Hanson, Minneapolis, Minn., assignor of fifty per cent to Gust Johnson, Minneapolis, Minn.

Application November 5, 1947, Serial No. 784,272

13 Claims. (Cl. 3—2)

My invention relates generally to improvements in artificial limbs and more specifically to the control of the articulation of knee joints in artificial legs.

The primary object of my invention is the provision of an artificial leg having a knee joint which will permit relatively free swinging movements of the leg below the knee joint when the weight of the wearer is removed therefrom, but which will automatically prevent such free swinging movements when the wearer's weight is applied to the leg whereby to avoid buckling of the leg, particularly when weight is applied thereto with the leg in a slightly bent condition. To this end, I provide a knee joint permitting relative pivotal and limited endwise movement of the upper and lower leg elements or sections one with respect to the other and brake or clutch means operated by pressure generated by application of the weight of the wearer to the leg.

Another highly important object of my invention is the provision of a knee joint for artificial legs which is capable of accomplishment of the above object without the use of a special harness or other like connections to the wearer's body.

Still another object of my invention is the provision of a knee joint as set forth, which is rugged in construction, and which is smooth and quiet in operation.

In accordance with the invention, the above and other highly important objects and advantages of the invention are achieved by a brake or clutch mechanism comprising axially contiguous cooperating brake or clutch elements respectively mounted for pivotal movements with opposite leg sections. In accordance with the preferred embodiment of the invention herein disclosed, the brake or clutch mechanism is of the friction type comprising cooperating friction brake or clutch elements respectively mounted for common pivotal movements with opposite leg sections. Also, in accordance with the preferred embodiment of the invention herein illustrated, the brake or clutch is set by an improved brake setting system or means utilizing hydraulic pressure generated by application of the wearer's weight to the leg and which is an important factor in achieving smooth, quiet and dependable brake setting operation.

The above and other objects and advantages of the invention will be made apparent from the following specification, claims and appended drawings.

Referring to the drawings in which like characters indicate like parts throughout the several views:

Fig. 1 is a fragmentary view in side elevation of an artificial leg illustrating a preferred embodiment of my invention;

Fig. 2 is an enlarged fragmentary view partly in front elevation and partly in section taken substantially on the line 2—2 of Fig. 1;

Fig. 3 is a transverse section taken on the line 3—3 of Fig. 2;

Fig. 4 is a fragmentary view partly in side elevation and partly in section taken on the line 4—4 of Fig. 2; and Fig. 5 is a fragmentary view corresponding to Fig. 2, but illustrating a modified form of my invention.

An artificial leg, indicated in its entirety by the numeral 1, comprises an upper leg or thigh section 2, a cooperating leg or calf section 3, and a foot section 4, carried by the lower end of the calf section 3 for limited pivotal movements about an ankle joint 5. The respective upper and lower leg sections 2 and 3 have their adjacent ends connected for pivotal and limited endwise movement, one with respect to the other thereof, by means of a knee joint 6. Both leg sections 2 and 3 are of a hollow structure and the ankle joint 5 and foot section 4 may be of any well known construction. The leg 1 is adapted to be secured to the body of a wearer by conventional means, not shown.

A knee joint element in the nature of a rectangular casing element 7 is held fast in a matching rectangular hole 8 extending transversely through the lower end portion of the upper leg section 2 and may be secured against axial movements therein by means of a set screw or the like 9. The casing 7 has an axial bore 10 and is internally threaded at either end to receive threaded end caps 11 provided with sealing gaskets 12.

A second pivot joint element in the nature of a knee bolt 13 extends axially through the casing 7 and bores 14 in the end caps 11 and is journalled in anti-friction bearings 15 contained in the end caps 11. At its ends, the knee bolt 13 is provided with depending arms 16 and 17 which, at their lower end portions, are formed to provide pistons 18. The depending arms 16 and 17 may be secured fast to the knee bolt 13 by any conventional means, but preferably and as shown, I form the arm 16 integrally with the knee bolt 13 and secure the arm 17 to the opposite end of the knee bolt 13 by means of a nut 19. A set screw or the like 20 further insures against rotary slippage between the knee bolt 13 and the arm 17.

The pistons 18 are longitudinally slidably mounted in fluid pressure cylinders 21, which are secured to the inner walls of the calf section 3 adjacent its upper end by means of clamping brackets or the like 22 and nut-equipped bolts 23. The cylinders 21 extend longitudinally of the lower leg or calf section 3 to provide for endwise movements of the leg elements, one with respect to the other. At their lower ends, the pistons 18 are provided with piston cups 24 which may be made from rubber, leather, or other material commonly used for this purpose.

I provide means for limiting endwise movement of the pistons 18 within the cylinders 21 in one direction, in the nature of adjustable stop screws 25 which are adapted to abut the lower ends of the cylinders 21. The stop screws 25 are threaded through the intermediate portions of U-shaped brackets 26 which extend longitudinally of the cylinders 21 in spaced relation thereto and have their upper free ends secured to respective arms 16 and 17 by means of rivets or the like 27 (see particularly Figs. 2 and 4). The stop screws 25 may be easily adjusted by insertion of a wrench, not shown, through slots 28 in the lower leg sections 3.

A preferred embodiment of my improved knee joint brake or clutch mechanism is indicated in the drawings as an entirety by 29, and is contained within the knee joint 6. This improved brake or clutch mechanism 29 comprises a plurality of friction brake or clutch elements 30 and a cooperating plurality of friction brake or clutch elements 31. Because the mechanism 29 can be described with equal accuracy as a clutch or brake, the terms "clutch" and "brake" are herein used synonymously. However, in the interest of brevity, the mechanism 29 will hereinafter be referred to as a "brake," and its friction elements 30 and 31 as "brake elements."

The brake elements 30 are in the form of annular metallic discs, and are anchored to the casing 7 for pivotal movements therewith and for axial movements with respect thereto by means of keys or the like 32. The brake elements 31 are also in the form of annular discs of somewhat smaller diameter than the discs 30 and are anchored to the knee bolt 13 for pivotal movements therewith and for axial sliding movements thereon by means of keys 33. The elements 31 are each disposed between and contiguous with adjacent elements 30 and are preferably made from metal of a different hardness than that of the elements 30.

A pair of annular piston cups 34 is contained within the joint 6, each abutting an opposite end of the friction brake. Each cup 34 forms a movable wall of an annular chamber 35 defined by the casing 7 and an end cup 11. Fluid passages 36 in the knee bolt 13 open into the chamber 35 and communicate with passages 37 in the arms 16 and 17 and the pistons 18. The passages 37 extend downwardly through the piston cups 24 into pressure chambers 38 defined by the piston cups 24 and the cylinders 21. The chambers 35 and 38 as well as the passages 36 and 37 are filled with hydraulic fluid indicated by the letter X. Conventional sealing rings 39 prevent leakage of fluid X around the knee bolt 13. Fluid X may be introduced into the system by removal of threaded plugs 40 in the passages 36, and conventional bleeders or vents, not shown, may be used to exhaust any air which may be trapped in the system.

In use, weight of the wearer upon the leg 1 will cause the pistons 18 to move downwardly in the cylinders 21 whereby to force fluid X contained in the chambers 38 to flow toward the chambers 35 in the joint 6 through the interconnecting passages 36 and 37 and move the pressure responsive piston cups 34 into brake setting engagement with the brake elements 30 and 31, thus frictionally holding the leg sections 2 and 3 from bending at the knee joint 6. It is important to note that when the wearer's weight is applied to the leg, whether the same is in a straight condition or slightly forwardly bent at the knee, the brake stops further buckling thereof and consequent falling of the wearer is effectively prevented. Removal of the wearer's weight from the leg will cause the lower leg section 3 to move away from the upper leg section 2 in an endwise direction whereby to relieve the pressure in the chambers 35.

It will be appreciated that the endwise movement of the leg sections required to move the elements of the brake 29 from a brake released to a brake actuated position need be very slight. In practice, the stop screws 25 are adjusted to a point where they lightly abut the ends of the cylinders 21 when the wearer's weight is removed from the leg. This adjustment preferably is such that a very gentle braking action is maintained even when the brake 29 is in a brake released condition so that, when the wearer is walking, the leg will swing naturally and not too loosely. With the adjustment thus maintained, endwise movement between the leg elements is imperceptible either to the wearer or to an observer and a very natural stride is achieved. Due to the fact that there is a minimum of movement of the friction brake elements and of the component parts of the fluid pressure system, adjustment of the stop screws 25 need very seldom be made.

In the modified form of my invention illustrated in Fig. 5, all of the parts similar to those shown in Figs. 1 to 4, inclusive, are identified by like characters with prime marks added. In this construction, fluid connections are made between the cylinders 21' and the pressure responsive pistons 34' by means of pipes or tubes 41 which connect the lower portions of the cylinders 21' with passages 36' in opposite ends of the knee bolt 13' by fittings 42 and 43, respectively. The tubes 41 extend exterior of the leg element 3' as shown, and although only one end of the knee bolt 13' is shown, it will be understood that fluid pressure connections are similar at the other end thereof.

While in the above specification, I have described a preferred embodiment and a modified form which my invention may assume in practice, it will, of course, be understood that the same is capable of further modification without departure from the spirit and scope of the invention as expressed in the following claims.

What I claim is:

1. In an artificial leg, cooperating upper and lower leg sections, a knee joint connecting adjacent ends of the leg sections for pivotal movements and for limited endwise movements one with respect to the other thereof, a friction brake for controlling pivotal movements of the leg sections, said friction brake comprising cooperating axially contiguous friction elements respectively mounted for common pivotal movements with opposite leg sections and for movements toward and from one another axially of the knee joint pivot axis; and a load transferring connection between said leg sections including the said cooperating friction brake elements, whereby application of the wearer's weight to the leg will be utilized to set the brake.

2. In an artificial leg, cooperating upper and lower leg sections, a knee joint connecting adjacent ends of the leg sections for pivotal movements and for limited endwise movements one with respect to the other thereof, said knee joint including a tubular joint element mounted for common pivotal movements with one of the leg sections and a knee bolt mounted for common pivotal movements with the other leg section and axially journalled in said tubular joint element, a friction brake in said tubular knee joint element for controlling pivotal movements of the leg sections, said friction brake comprising cooperating axially contiguous friction brake elements respectively mounted for common pivotal movements with said tubular element and said knee bolt and for movements toward and from one another axially of the knee joint pivot axis; and a load transferring connection between said leg sections including said cooperating friction brake elements, whereby application of the wearer's weight to the leg will be utilized to set the brake.

3. In an artificial leg, cooperating upper and lower leg sections, a knee joint connecting adjacent ends of the leg sections for pivotal movements and for limited endwise movements one with respect to the other thereof, said knee joint including a tubular joint element mounted for common pivotal movements with one of the said leg sections and a knee bolt mounted for common pivotal movements with the other leg section and axially journalled in said tubular joint element, a plurality of axially spaced annular friction elements anchored in said tubular element for common pivotal movements therewith and axially movable with respect thereto, a plurality of annular friction elements anchored on said knee bolt for common pivotal movements therewith and axially movable with respect thereto, said last-mentioned friction elements being disposed each between adjacent friction elements anchored in said tubular element, and a load transferring connection between said leg sections including the said cooperating friction brake elements, whereby application of the wearer's weight to the leg will be utilized to set the friction elements.

4. In an artificial leg, cooperating upper and lower leg sections, a knee joint connecting adjacent ends of the leg sections for pivotal movements and for limited endwise movements one with respect to the other thereof, a friction brake for controlling pivotal movements of the leg sections, said friction brake comprising cooperating friction elements respectively mounted for common pivotal movements with opposite leg sections and for movements toward and from one another; fluid pressure generating means on one of said leg sections, fluid pressure responsive actuating means associated with one of said friction brake elements, and a fluid pressure connection between said actuating means and said pressure generating means, whereby application of the wearer's weight will be utilized to set the brake.

5. In an artificial leg, cooperating upper and lower leg sections, a knee joint connecting adjacent ends of the leg sections for pivotal movements and for limited endwise movements one with respect to the other thereof; a friction brake for controlling pivotal movements of the leg sections, said friction brake comprising cooperating axially contiguous friction elements respectively mounted for common pivotal movements with opposite leg sections and for movements toward and from one another axially of the knee joint pivot axis, and a load transferring connection between said leg sections comprising said cooperating friction brake elements, fluid pressure responsive actuating means associated with said brake elements, fluid pressure generating means associated with one of said leg members, and a fluid pressure connection between and said fluid pressure responsive actuating means and said fluid pressure generating means, whereby application of the wearer's weight to the leg will be utilized to set the brake.

6. The structure defined in claim 2 in which said load bearing connections further include fluid pressure responsive actuating means associated with said friction brake elements, fluid pressure generating means associated with one of said leg members, and a fluid connection between said generating means and said fluid pressure responsive actuating means.

7. The structure defined in claim 3 in which said load bearing connections further include fluid pressure responsive actuating means associated with said friction brake elements, fluid pressure generating means associated with one of said leg members, and a fluid connection between said generating means and said fluid pressure responsive actuating means.

8. In an artificial leg, cooperating upper and lower leg sections, a knee joint connecting adjacent ends of the leg sections for pivotal and endwise movements one with respect to the other thereof, adjustable means for limiting endwise movements of the leg sections toward and from one another, a friction brake for controlling pivotal movements of the leg sections, said friction brake comprising cooperating axially contiguous friction elements respectively mounted for common pivotal movements with opposite leg sections and for movements toward and from one another axially of the knee joint pivot axis, and a load transferring connection between said leg sections including said cooperating friction brake elements, whereby application of the wearer's weight to the leg will be utilized to set the brake.

9. In an artificial leg, cooperating upper and lower leg sections, a knee joint connecting adjacent ends of the leg sections for pivotal and endwise movements one with respect to the other thereof, adjustable means for limiting endwise movements of the leg sections toward and from one another, said knee joint including a tubular joint element mounted for common pivotal movements with one of said leg sections and a knee bolt mounted for common pivotal movements with the other leg section and axially journalled in said tubular joint element, a plurality of axially spaced annular friction elements anchored in said tubular element for common pivotal movements therewith and axially movable with respect thereto, a plurality of annular friction elements anchored on said knee bolt for common pivotal movements therewith and axially movable with respect thereto, said last-mentioned friction elements being disposed each between adjacent friction elements anchored in said tubular element, and a load transferring connection between said leg sections including said cooperating friction brake elements whereby application of the wearer's weight to the leg will be utilized to set the friction elements.

10. In an artificial leg, cooperating upper and lower leg sections, a knee joint connecting adjacent ends of the leg sections for pivotal movements and for limited endwise movements one with respect to the other thereof, said knee joint comprising a generally tubular joint element mounted for common pivotal movements with one of said leg sections, a knee bolt mounted for common pivotal movements with the other leg section and axially journalled in said tubular element, and a pair of spaced fluid pressure generating piston members extending radially outwardly from opposite end portions of said knee bolt; a pair of cylinders fast on the other of said leg sections in which said piston members are adapted to work, friction brake elements respectively mounted for common pivotal movements with said tubular member and said knee bolt and movable toward and from one another axially of the knee joint pivot axis, fluid pressure responsive means associated with said friction brake elements, and fluid connections between said cylinders and said fluid pressure responsive means whereby the weight of the wearer upon the leg will be transferred through said connections to set the friction elements.

11. In an artificial leg, cooperating upper and lower leg sections, a knee joint connecting adjacent ends of the leg sections for pivotal movements and for limited endwise movements one with respect to the other thereof, a brake for controlling relative pivotal movements of the leg sections, said brake comprising axially contiguous cooperating brake elements respectively mounted for common pivotal movements with opposite leg sections and for movements toward and from one another axially of the knee joint pivot axis; and a load transferring connection between the leg sections including the said cooperating brake elements, whereby application of the wearer's weight to the leg will be utilized to set the brake.

12. In an artificial leg, cooperating upper and lower leg sections, a knee joint connecting adjacent ends of the leg sections for pivotal movements and for limited endwise movements one with respect to the other thereof, a brake for controlling pivotal movements of the leg sections, said brake comprising cooperating brake elements respectively mounted for common pivotal movements with opposite leg sections and for movements toward and from one another; fluid pressure generating means on one of the leg sections, fluid pressure responsive actuating means associated with one of said brake elements, and a fluid pressure connection between said actuating means and said pressure generating means, whereby application of the wearer's weight will be utilized to set the brake.

13. In an artificial leg, cooperating upper and lower leg sections, a knee joint connecting adjacent ends of the leg sections for pivotal and endwise movements one with respect to the other thereof, adjustable means for limiting endwise movements of the leg sections toward and from one another, a brake for controlling pivotal movements of the leg sections, said brake comprising cooperating axially contiguous brake elements respectively mounted for common pivotal movements with opposite leg sections and for movements toward and from one another axially of the knee joint pivot axis, and a load transferring connection between said leg sections including said cooperating brake elements, whereby application of the wearer's weight to the leg will be utilized to set the brake.

ARNOLD B. HANSON.

REFERENCES CITED

The following references are of record in the file of this patent:

UNITED STATES PATENTS

| Number | Name | Date |
| --- | --- | --- |
| 762,031 | Engels | June 7, 1904 |
| 2,175,136 | Stewart | Oct. 3, 1939 |
| 2,400,032 | Talbot | May 7, 1946 |
| 2,450,728 | Havens | Oct. 5, 1948 |